(12) United States Patent
Kang et al.

(10) Patent No.: US 7,997,126 B2
(45) Date of Patent: Aug. 16, 2011

(54) TEXTURE MEASURING APPARATUS AND METHOD

(75) Inventors: Sung Chul Kang, Seoul (KR); Hyouk Ryeol Choi, Gyeonggi-do (KR)

(73) Assignee: Korea Institute of Science and Technology, Seoul (KR)

(*) Notice: Subject to any disclaimer, the term of this patent is extended or adjusted under 35 U.S.C. 154(b) by 490 days.

(21) Appl. No.: 12/216,007

(22) Filed: Jun. 27, 2008

(65) Prior Publication Data

US 2009/0013771 A1  Jan. 15, 2009

(30) Foreign Application Priority Data

Jul. 10, 2007 (KR) .................. 10-2007-0068968

(51) Int. Cl.
*G01B 5/28* (2006.01)
(52) U.S. Cl. ......................................................... 73/105
(58) Field of Classification Search ........................ 73/105
See application file for complete search history.

(56) References Cited

U.S. PATENT DOCUMENTS

| | | | |
|---|---|---|---|
| 4,776,212 A | 10/1988 | Parsons et al. | |
| 5,672,929 A | 9/1997 | Gutsell et al. | |
| 6,621,080 B2 | 9/2003 | Yamamoto | |
| 7,076,883 B2* | 7/2006 | Yamamoto et al. | 33/556 |
| 7,318,285 B2* | 1/2008 | Matsumiya et al. | 33/561 |
| 7,357,035 B2* | 4/2008 | Liu et al. | 73/756 |
| 7,392,692 B2* | 7/2008 | Noda | 73/105 |
| 7,509,869 B2* | 3/2009 | Liu et al. | 73/756 |
| 7,516,671 B2* | 4/2009 | Liu et al. | 73/756 |
| 2005/0237581 A1 | 10/2005 | Knighton et al. | |

FOREIGN PATENT DOCUMENTS

| EP | 0 932 020 | 7/1999 |
|---|---|---|
| EP | 1 503 174 | 2/2005 |

OTHER PUBLICATIONS

"A tactile-slip complex sensor based on PVDF", Feb. 28, 1997.

* cited by examiner

*Primary Examiner* — Hezron Williams
*Assistant Examiner* — Rodney T Frank
(74) *Attorney, Agent, or Firm* — Bacon & Thomas, PLLC

(57) ABSTRACT

A texture measuring apparatus that measures surface information of an object includes: a probe coming into contact with the object while moving on a surface of the object; a first sensor unit, provided at the probe, for detecting a force acting on the probe in a direction perpendicular to a lengthwise direction of the probe; and a second sensor unit, provided at the rear of the probe, for detecting a force acting on the probe in the lengthwise direction of the probe. The apparatus further includes a third sensor unit, provided between the first sensor unit and the second sensor unit, for detecting variations in the forces acting on the probe.

26 Claims, 12 Drawing Sheets

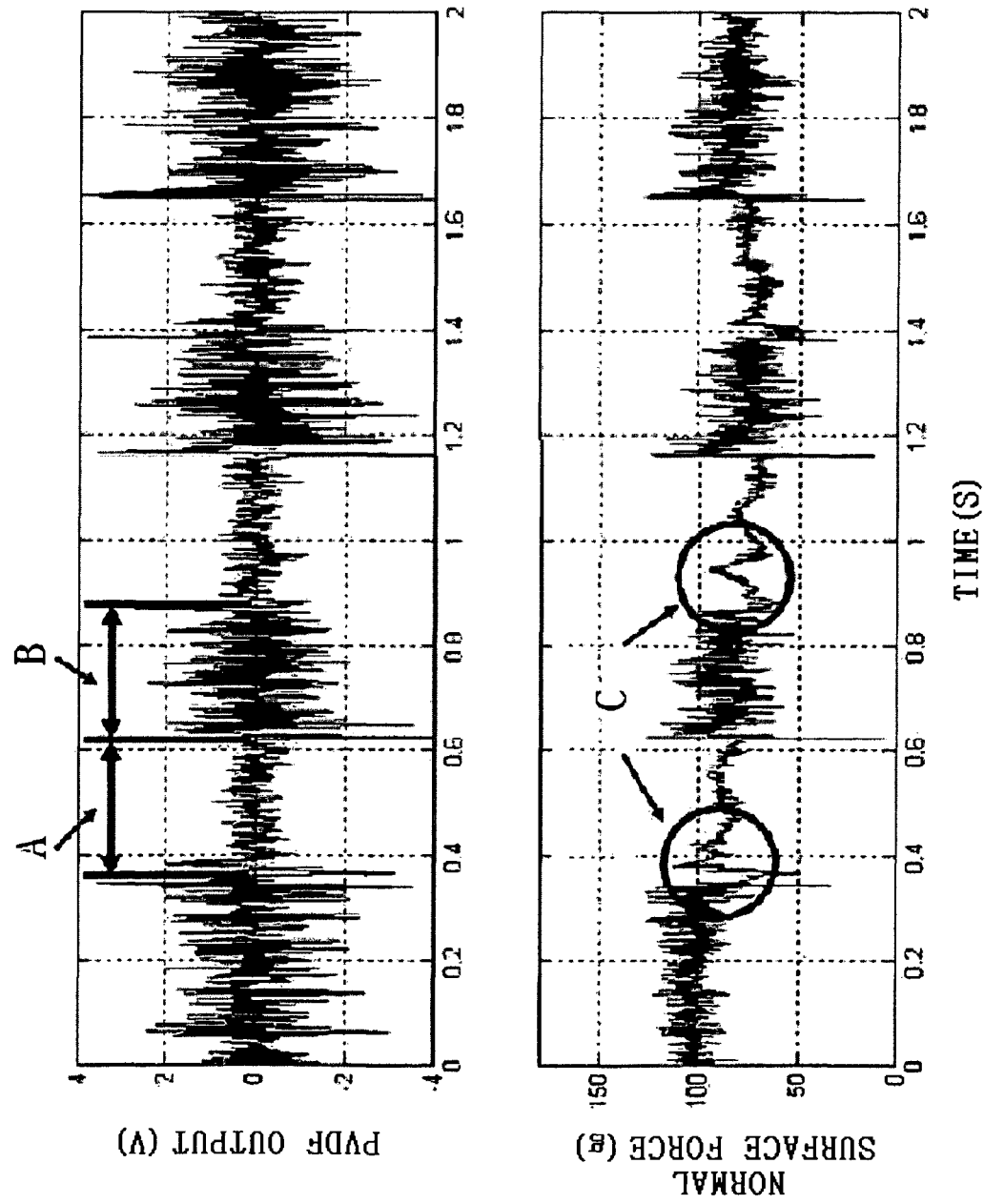

TEXTURE MEASURING APPARATUS AND METHOD

FIELD OF THE INVENTION

The present invention relates to a texture measuring apparatus and method; and, more particularly, to a texture measuring apparatus and method capable of obtaining tactile information on a surface of an object based on a surface force acting on a probe, thereby obtaining surface information of the object.

BACKGROUND OF THE INVENTION

Technologies providing reality to make a user feel a sense of realism in a virtual space are collectively called "TI (Tangible Interface)", and a new concept of space including the user, virtual reality and a real world is called "tangible space".

To realize the tangible space, it is first of all important to project and reflect a real life space thereon. Meanwhile, in order to allow the user to feel realism in a cyberspace implemented by a computer, stimuli for various senses need to be simultaneously provided. That is, complex senses, such as vision, touch, hearing, and the like need to be fused and provided to the user. Since a human usually recognizes objects and environments through the sense of sight, information obtained by a visual sensor is one of important information in profiling and recognizing an object.

3-dimensional data for an unknown object is restored by using the information obtained by the visual sensor and provided to the virtual space, thereby constructing the virtual space, but it is not sufficient for the user to accurately recognize the unknown object. For example, at a dark place or in a poorly lighted environment, it is impossible to accurately recognize the object with the visual sensor. Further, the rear side of the object out of vision cannot be recognized until an additional camera is provided at the rear side of the object or until special radar capable of detecting the rear side of the object is employed. Furthermore, it is difficult to recognize the texture or partial profile of the object surface through the vision.

To realize an accurate tangible space technology, it is important to develop a technology which realizes the stimuli and behaviors of the user on the basis of information about the sense of touch in the real world as well as the visual information. In particular, as a pre-requisite to realize the tangible space, development of a tactile sensor capable of providing tangible information by detecting the texture or partial profile of the object in the real world is demanded.

Conventionally, the measurement of the texture (i.e., surface roughness) of the object is performed only based on the visual information on the object surface obtained by optical cameras, which results in deterioration in accuracy. Alternatively, there is also suggested a method in which a laser is irradiated onto the object surface and information of the object surface is measured on the basis of reflected information from the object. According to this method, however, sufficient accuracy in measuring the surface texture of the object cannot be achieved.

Meanwhile, many tactile sensors have been developed to provide the tactile information of the object surface, but they have not been widely used in view of cost, reliability, and structural complexity. Further, studies using the conventional tactile sensors have been concentrated on the implementation of static recognition of the object profile. Therefore, though the contact position or contact force of the object can be expressed by using the conventional tactical sensors, dynamic changes according to the surface roughness, i.e., texture, cannot be sufficiently expressed.

SUMMARY OF THE INVENTION

In view of the above, the present invention provides a texture measuring apparatus and method capable of expressing texture of an object 3-dimensionally and accurately.

In accordance with an aspect of the present invention, there is provided a texture measuring apparatus that measures surface information of an object, the apparatus including: a probe coming into contact with the object while moving on a surface of the object; a first sensor unit, provided at the probe, for detecting a force acting on the probe in a direction perpendicular to a lengthwise direction of the probe; a second sensor unit, provided at the rear of the probe, for detecting a force acting on the probe in the lengthwise direction of the probe; and a third sensor unit, provided between the first sensor unit and the second sensor unit, for detecting variations in the forces acting on the probe.

In accordance with another aspect of the present invention, there is provided a texture measuring apparatus that measures surface information of an object, the apparatus including: a cylindrical housing; a main body fixed at the front end portion of the housing; a bar-shaped probe provided at the center of the main body along the central axis of the cylindrical housing; a strain gauge, provided at the probe, for detecting a force acting on the probe in a direction perpendicular to a lengthwise direction of the probe; a force sensor, provided at the rear of the probe, for detecting a force acting on the probe in the lengthwise direction of the probe; and one or more piezoelectric films provided between the strain gauge and the force sensor, for detecting variations in the forces acting on the probe.

In accordance with still another aspect of the present invention, there is provided a texture measuring method that measures surface information of an object, the method including: moving a probe while the probe is kept being in contact with a surface of the object and; and generating signals according to a force acting on the probe in a direction perpendicular to a lengthwise direction of the probe, a force acting on the probe in the lengthwise direction of the probe, and variations in the forces acting on the probe.

In accordance with the present invention, the surface roughness of an object can be measured accurately by measuring both a static surface force and a dynamic surface force of the object. Further, the texture measuring apparatus has a compact configuration so that a user can easily use the texture measuring apparatus. The apparatus is implemented with a compact general-purpose apparatus, so as to be conveniently used in an inaccessible narrow space.

BRIEF DESCRIPTION OF THE DRAWINGS

The above features of the present invention will become apparent from the following description of embodiments, given in conjunction with the accompanying drawings, in which:

FIG. 12 illustrates measurement results in which the texture measuring apparatus in accordance with the present invention was moved onto a desk, the desk having tapes adhered thereon at regular intervals.

DETAILED DESCRIPTION OF THE EMBODIMENTS

Embodiments of the present invention will be described in detail with reference to the accompanying drawings, which form a part hereof.

Figure 1:
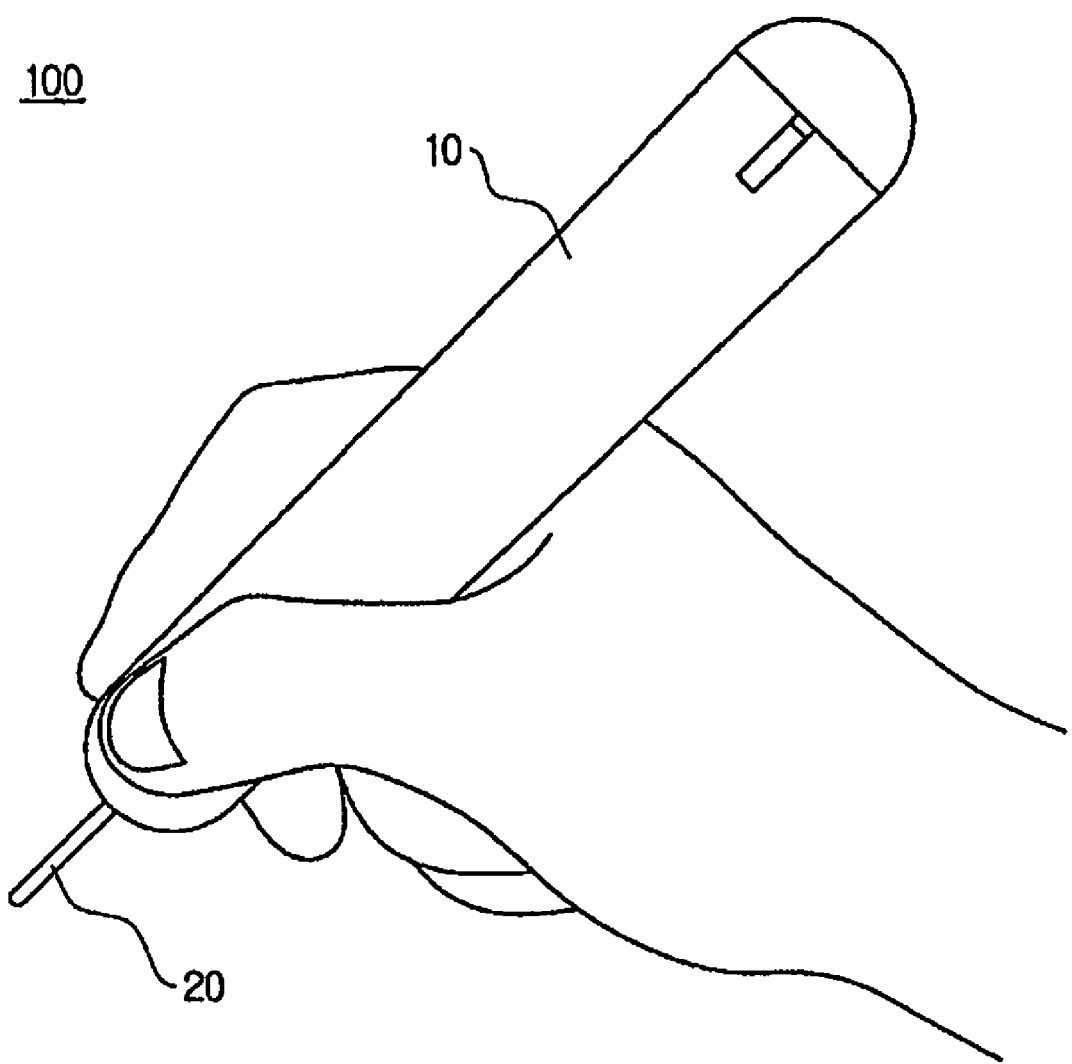
FIG. 1 illustrates a use state view of a texture measuring apparatus in accordance with an embodiment the present invention.

FIG. 1 illustrates a use state view of a texture measuring apparatus in accordance with an embodiment the present invention. Further, FIGS. 2 and 3 illustrate an exploded perspective view and a partial side view of the texture measuring apparatus shown in FIG. 1, respectively.

Referring to FIG. 1, a texture measuring apparatus 100 has a pen-type structure for ease of gripping. To be specific, the texture measuring apparatus 100 includes a cylindrical housing 10 and a probe 20. The probe 20 is designed to protrude at the front end of the cylindrical housing 10 to come into direct contact with an object.

Figure 2:
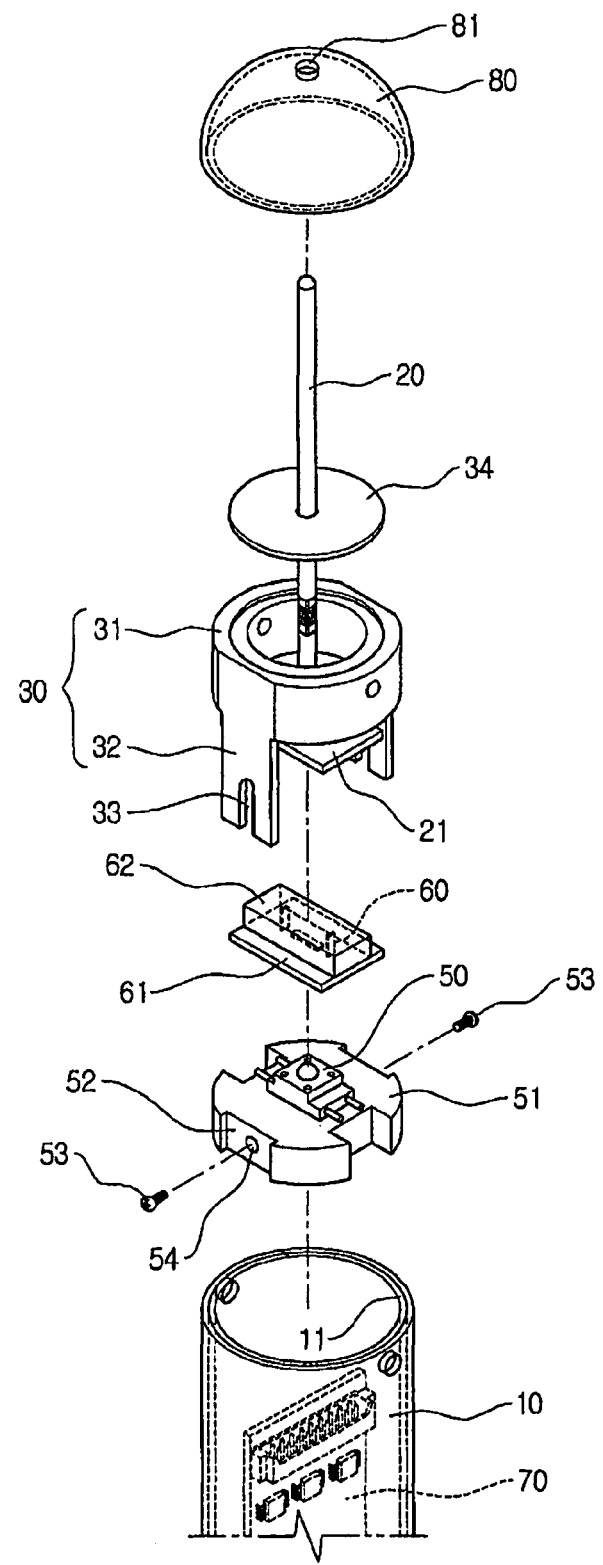
FIG. 2 illustrates an exploded perspective view of the texture measuring apparatus shown in FIG. 1.
Figure 3:
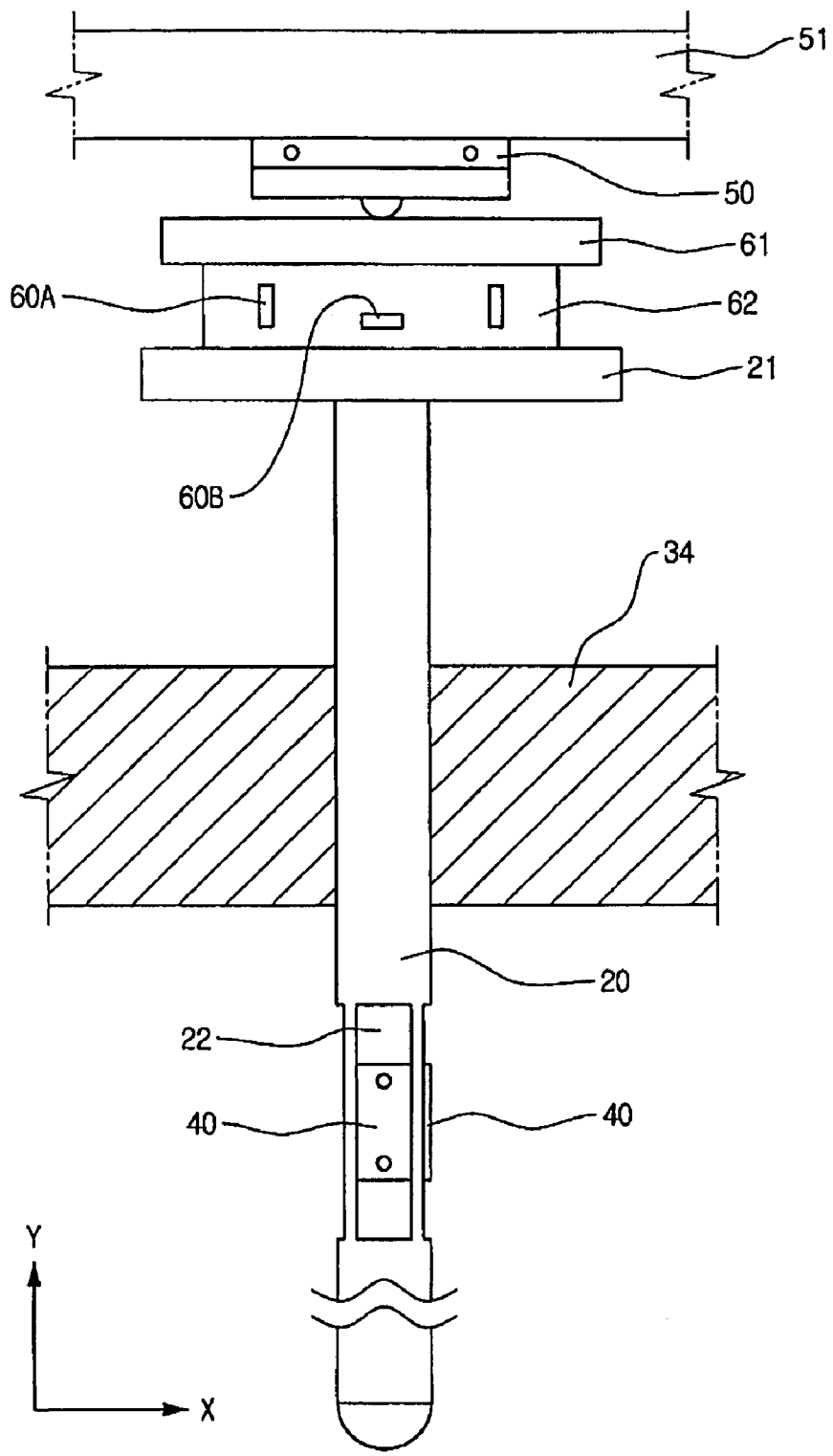
FIG. 3 illustrates a partial side view of the texture measuring apparatus shown in FIG. 1.

As best shown in FIGS. 2 and 3, the texture measuring apparatus 100 further includes: a main body 30 housed in the housing 10; a first sensor unit 40 provided at the probe 20; a second sensor unit 50 provided at the rear of the probe 20; and a third sensor unit 60 provided between the probe 20 and the second sensor unit 50.

The cylindrical housing 10 has an inside layer 11, formed of, e.g., copper, for suppressing occurrence of noise. The housing 10 may be formed of plastic, and may have a circular section for ease of gripping. However, the sectional shape of the housing 10 is not limited to the circular shape, but can be various shapes such as a rectangular shape and the like.

Mounted inside the housing 10 is a circuit module 70 for controlling signals generated by the sensor units 40, 50 and 60. The sensor units 40, 50 and 60 are connected to the circuit module 70 via a plurality of electric wires (not shown).

The main body 30 is inserted into the front end portion of the housing 10 and fixed thereat by a coupling member (not shown) such as a bolt. The main body 30 has a circular ring 31 and a pair of wings 32, the wings 32 extending rearward from the outer peripheral surface of the circular ring 31. At the end of each wing 32, a slot 33 is formed.

A disc bearing 34 having a hole at the center thereof is fixed at the front of the main body 30, such that the probe 20 is allowed to move in an axial direction while movements in a radial direction are restricted.

The probe 20 is a bar elongated along the central axis of the cylindrical housing 10, and is provided at the center of the main body 30 while passing through the hole in the bearing 34. At the rear end of the probe 20, a press plate 21 is provided to uniformly press the third sensor unit 60 to be described later. The press plate 21 is preferably has a rectangular shape, but it may have various shapes such as a circular shape and the like.

At the probe 20, the first sensor unit 40 is provided to detect a force acting in a direction (in the X-axis direction in FIG. 3) perpendicular to a lengthwise direction of the probe 20 (in the Y-axis direction in FIG. 3). The first sensor unit 40, which may be a strain gauge, is attached on a surface of the probe 20. Meanwhile, the probe 20 has one or more, e.g., four, flat portions 22, such that the strain gauge can be easily attached on the surface of the probe 20.

Further, a pair of strain gauges can be attached to accurately detect the deformation of the probe 20. In this case, it is preferable that the strain gauges are attached on two flat portions 22 adjacent to each other.

At the rear of the press plate 21, the second sensor unit 50 is provided to detect a force acting in the lengthwise direction of the probe 20. The second sensor unit 50, which may be a known force sensor, is fixed onto the top surface of a fixing plate 51. At the side surface of the fixing plate 51, a pair of receiving grooves 52 in which the wings 32 of the housing 30 are placed is formed.

At each portion of the side surface of the fixing plate 51 at which the receiving groove 52 is formed, a bolt hole 54 into which a bolt 53 is inserted is formed. With this structure, if the wings 32 of the housing 30 are placed in the receiving grooves 52 of the fixing plate 51, and then the blots 53 are inserted into the bolt holes 54 via the slots 33 and fastened, the housing 30 and the fixing plate 51 are coupled with each other.

Between the press plate 21 and the second sensor unit 50, the third sensor unit 60 is provided to detect variations in the forces acting on the probe 20 in the lengthwise direction of the probe 20 and in the direction perpendicular thereto. The third sensor unit 60 may be a piezoelectric film that generates a voltage when the forces are changed. The piezoelectric film may be formed of PVDF (polyvinylidene fluoride).

The third sensor unit 60 is provided on a bumper 61, and may be covered with a protection layer 62, formed of, e.g., silicon material, for protecting the third sensor unit 60 against external impact.

Further, the third sensor unit 60 may be buried in several in the protection layer 62; a sensor unit 60A disposed in the lengthwise direction of the probe 20 and a sensor unit 60B disposed in a direction perpendicular to the lengthwise direction of the probe 20. This enables to detect force variations in the lengthwise direction of the probe 20 and in the direction perpendicular thereto.

A cover 80 has a through-hole 81 at the center thereof and is fixed to the housing 10, to thereby protect all of the above-described components of the texture measuring apparatus 100, excluding the probe 20, against external impact.

Figure 4:
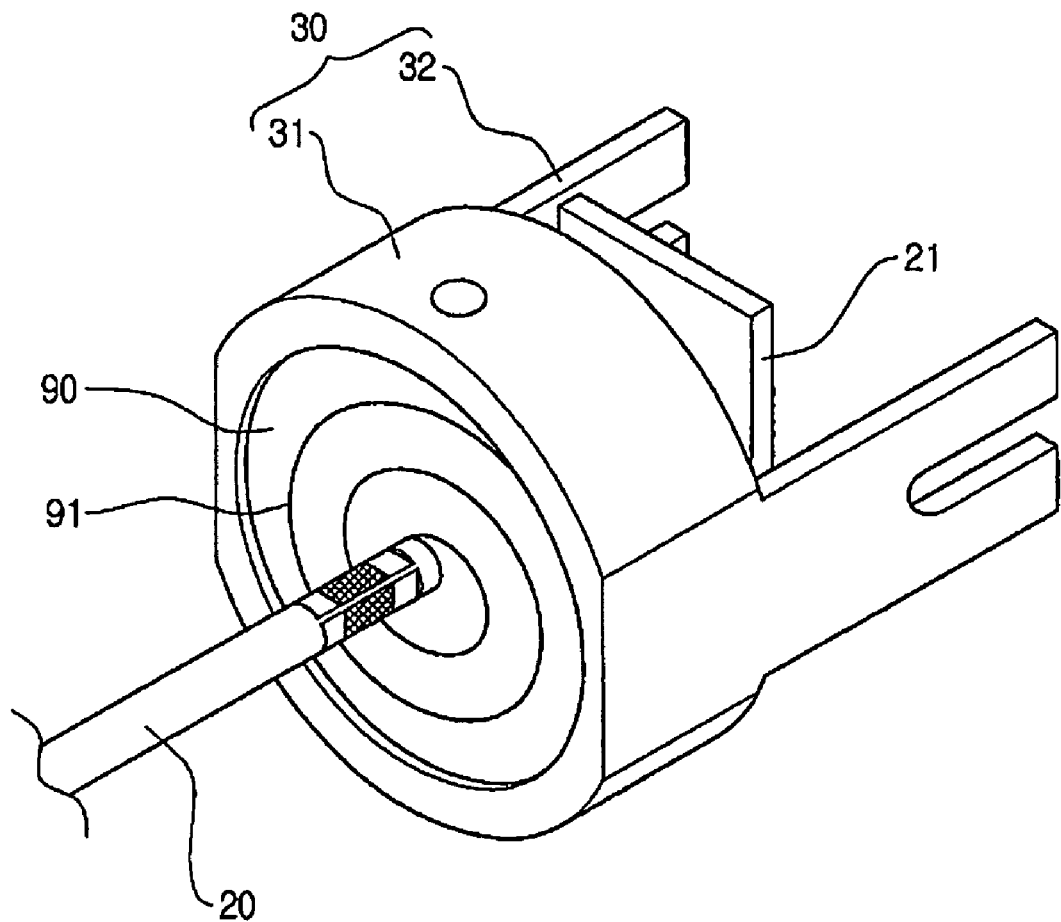
FIG. 4 illustrates a partial perspective view of a texture measuring apparatus in accordance with another embodiment of the present invention.

FIG. 4 illustrates a partial perspective view of a texture measuring apparatus in accordance with another embodiment of the present invention.

A texture measuring apparatus 200 of this embodiment is substantially identical to the first embodiment, except that it further includes a bearing 90. In the following description, therefore, detailed description for the above-described embodiment will be omitted for the sake of simplicity.

The bearing 90 is provided between the probe 20 and the circular ring 31. The bearing 90 has elasticity by having a cutout 91 formed along a circumferential direction thereof. If a force acts on the probe 20 in the lengthwise direction, the bearing 90 is deformed to allow the movement of the probe 20 in the lengthwise direction. If the force acting on the probe 20 is removed, the bearing 90 is restored to allow the probe 20 to restore the original position thereof. That is, the bearing 90 elastically supports the probe 20, like a spring.

Figure 5:
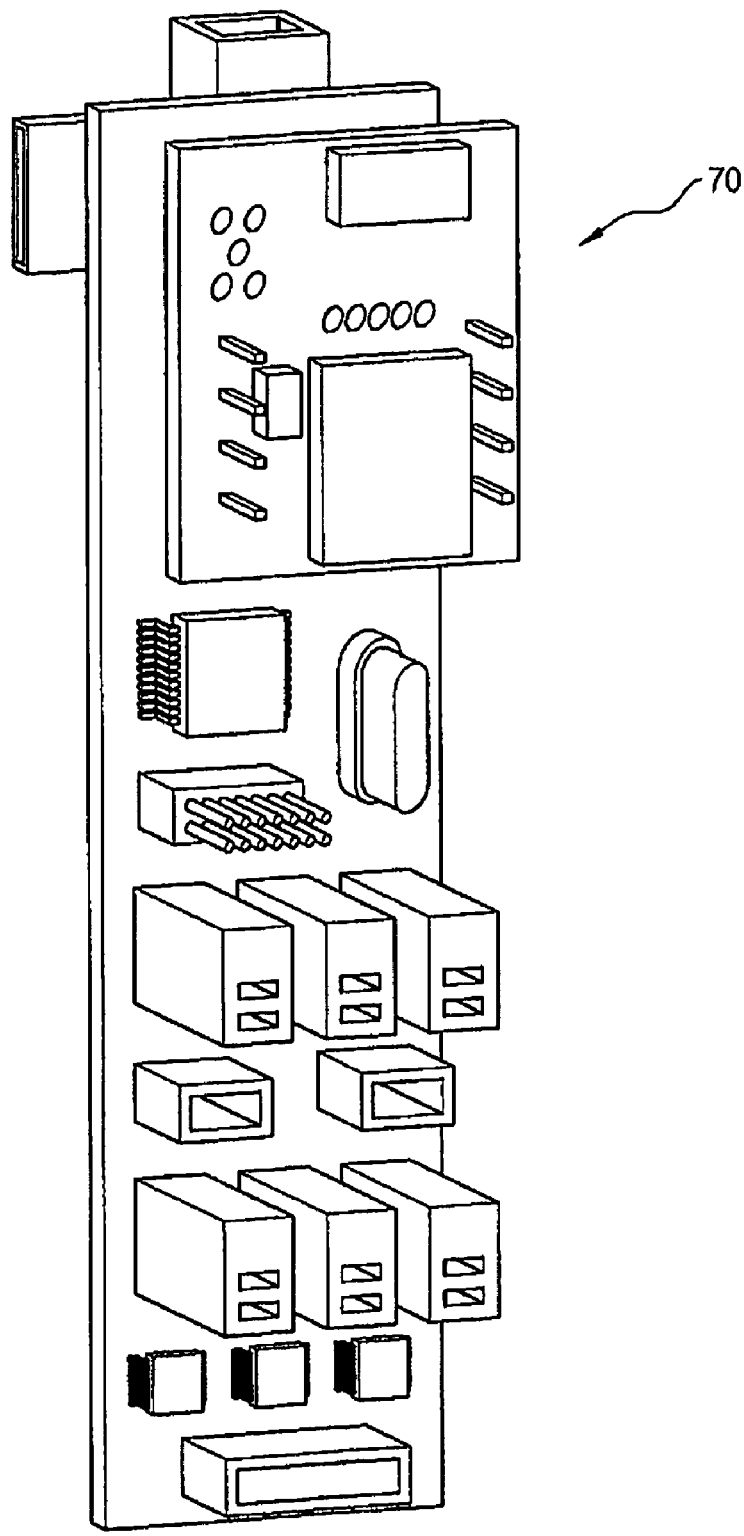
FIG. 5 illustrates a perspective view of a circuit module in the texture measuring apparatus in accordance with the present invention.
Figure 6:
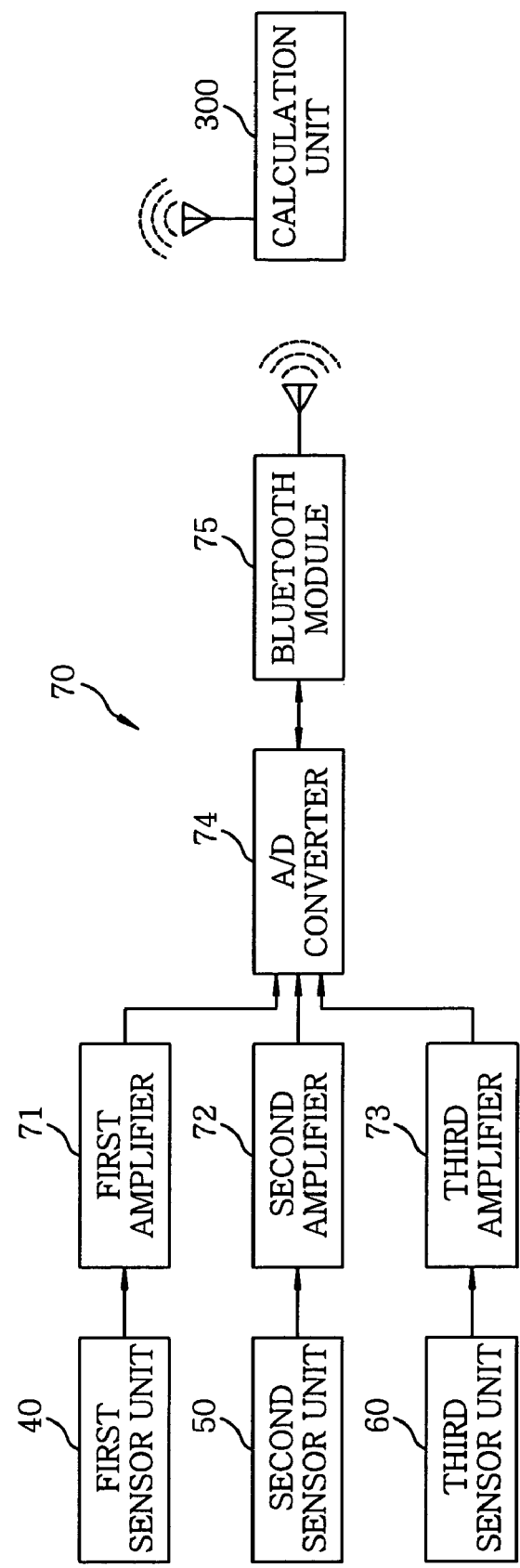
FIG. 6 illustrates an exemplary view for explaining signal flow in the texture measuring apparatus in accordance with the present invention.

FIG. 5 illustrates a perspective view of a circuit module in the texture measuring apparatus in accordance with the present invention, and FIG. 6 illustrates an exemplary view for explaining signal flow in the texture measuring apparatus in accordance with the present invention.

Hereinafter, the operation of the texture measuring apparatus according to the embodiments of the present invention will be described.

Referring to FIGS. 2, 4, 5 and 6, if the probe 20 of the texture measuring apparatus 100 or 200 is placed on a surface of an object and moved, a specific force acts on the probe 20, and then the probe 20 is deformed. Here, the force acting on the probe 20 is decomposed into a force acting in the lengthwise direction of the probe 20 (hereinafter, referred to as "lengthwise force") and a force acting in a direction perpendicular to the lengthwise direction of the probe 20 (hereinafter, referred to as "vertical force").

The first sensor unit 40 detects the flexure of the probe 20 by the vertical force, thereby measuring the vertical force. When a strain gauge is used as the first sensor unit 40, the first sensor unit 40 generates a voltage signal according to a change in resistance of the strain gauge due to the flexure. The voltage signal may be generated by using a known Wheatstone bridge circuit. The generated signal is amplified by a first amplifier 71.

The second sensor unit 50 detects the lengthwise force applied by the press plate 21 of the probe 20 to generate a voltage signal. The voltage signal is amplified by a second amplifier 72. As the second amplifier 72, a differential amplifier may be employed.

The third sensor unit 60 detects a variation in the force applied by the press plate 21 of the probe 20. That is, the third sensor unit 60 does not measure the absolute magnitude of the force, but detects a degree of variation in the force. Accordingly, when a constant force is applied, the third sensor unit 60 generates no signal. As described above, a PVDF piezoelectric film may be employed as the third sensor unit. The PVDF piezoelectric film generates a voltage when the force is changed. The generated voltage signal is amplified by a third amplifier 73. As the third amplifier 73, a charge amplifier may be employed.

The signals amplified by the first to the third amplifiers 71 to 73 are converted into digital signals by an A/D converter 74. The signals are transmitted to a 300, which may be implemented with a computer, by, e.g., a Bluetooth module 75 through wireless communications. Although, the texture measuring apparatus 100 or 200 transmits the converted digital signals through wireless communications in the example shown in FIG. 6, the present invention is not limited thereto, but the converted digital signals may be transmitted through wired communications.

In case of using wireless communications, a sampling rate for A/D conversion is limited to 3 kHz. However, studies on the neurophysiology have reported that tactile information is transmitted by low-frequency vibration signals. Also, studies on the tactile sensor uses a sampling rate lower than 1 kHz. Accordingly, A/D conversion with the sampling rate of 3 kHz may have sufficient accuracy. In case of using wired communications, the sampling rate is not limited, and a high sampling rate, e.g., 25 kHz, can be used.

The calculation unit 300 calculates the vertical force, the lengthwise force and the variations in the forces based on the received signals. Based on the vertical force and the lengthwise force, the frictional coefficient of the object surface can be calculated, and based on the calculation result, the surface roughness of the object can be estimated.

Meanwhile, when the texture measuring apparatus 100 or 200 is positioned to be perpendicular to the surface of the object, the vertical force is identical to a tangential surface force, and the lengthwise force is identical to a normal surface force. Accordingly, in this case, the frictional coefficient can be calculated based on the vertical force and the lengthwise force detected by the first sensor unit 40 and the second sensor unit 50, respectively. However, when the texture measuring apparatus 100 or 200 is inclined at a specific angle with respect to the normal of the surface, it is required to compensate the vertical force and the lengthwise force detected by the first sensor unit 40 and the second sensor unit 50, respectively.

Hereinafter, the measurement results of the surface information of the object by using the texture measuring apparatus 100 in accordance with the present invention will be described.

Figure 7:
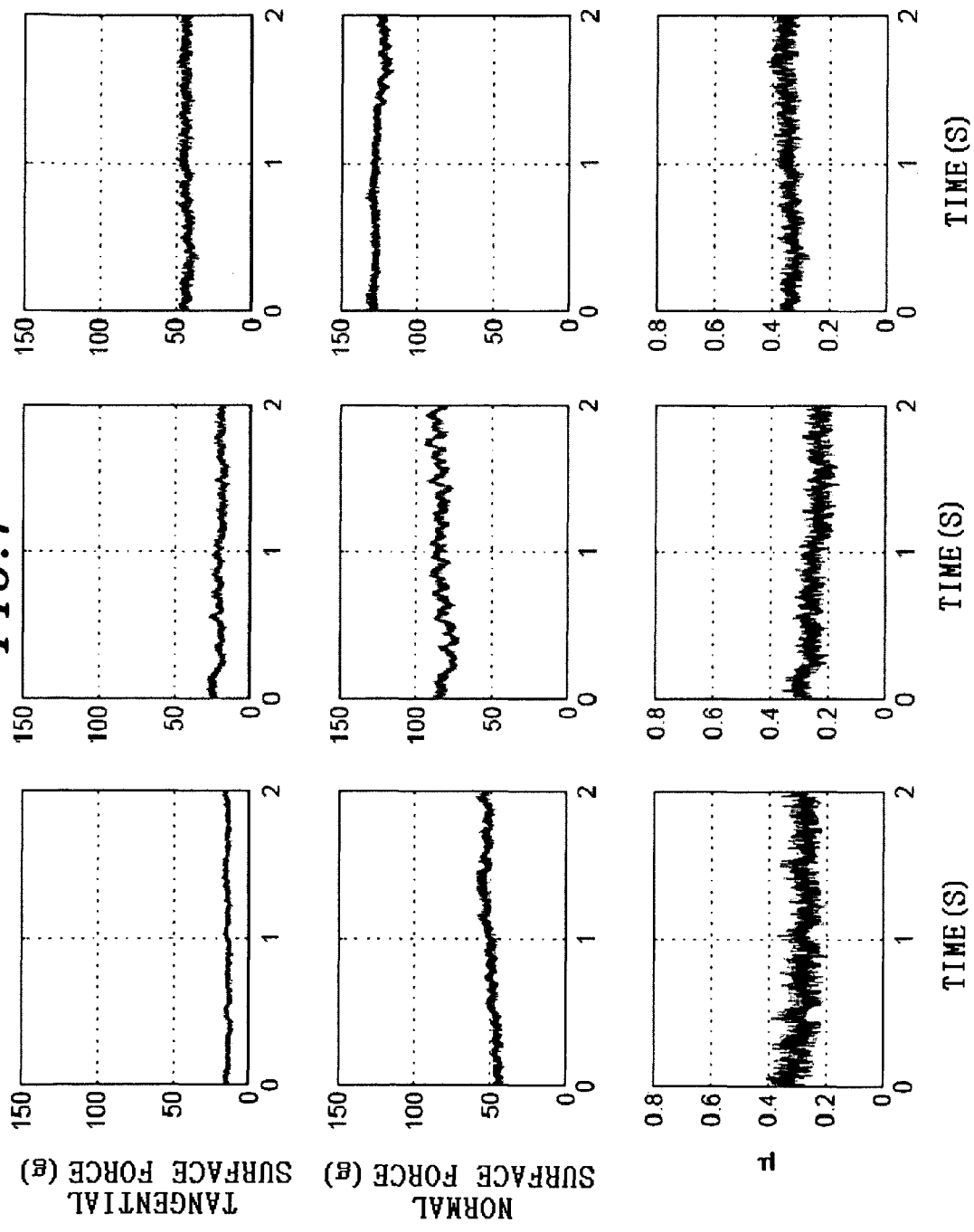
FIG. 7 illustrates a surface force measurement result in which the texture measuring apparatus in accordance with the present invention was moved onto a mouse pad.
Figure 8:
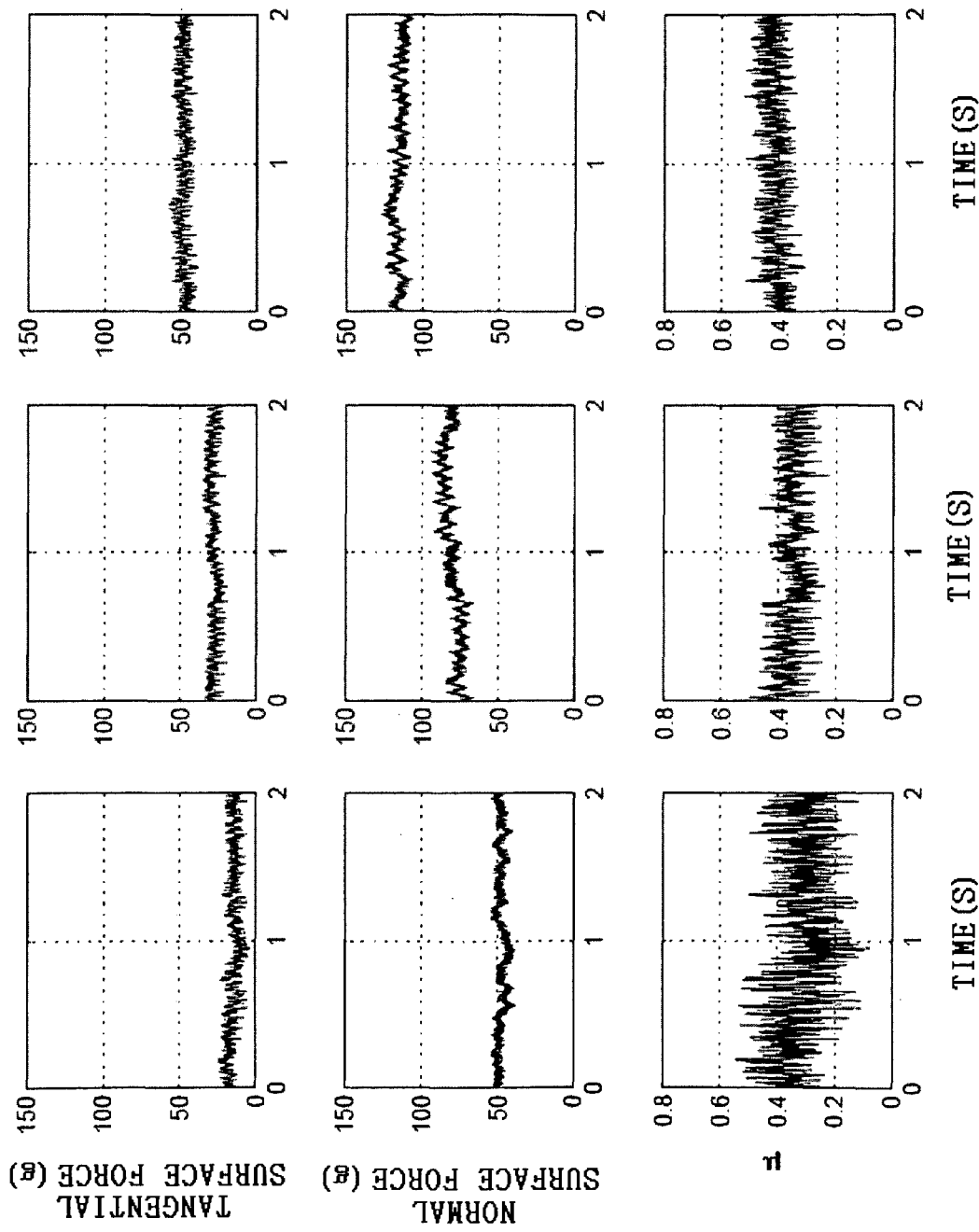
FIG. 8 illustrates a surface force measurement result in which the texture measuring apparatus in accordance with the present invention was moved onto a coarse cloth.

FIGS. 7 and 8 illustrate surface force measurement results in which the texture measuring apparatus in accordance with the present invention was moved onto a mouse pad and onto a coarse cloth, respectively.

Specifically, FIGS. 7 and 8 illustrate graphs of the surface force measurement results in which the texture measuring apparatus 100 in accordance with the present invention was moved onto the mouse pad and onto the coarse cloth three times, respectively. In FIGS. 7 and 8, the graphs in the first to third rows show the surface force measurement results for the first to the third time, respectively.

Here, the frictional coefficient $\mu$ of the surface of the object was calculated based on the tangential surface force and the normal surface force.

As shown in FIGS. 7 and 8, the frictional coefficient $\mu$ of the coarse cloth was larger than that of the mouse pad and a variation in the frictional coefficient $\mu$ of the coarse cloth was also larger than that of the mouse pad. This means that, the surface of the coarse cloth is slightly rougher than that of the mouse pad due the fibrous tissue thereof.

As well as the surface roughness of the object can be measured by using the frictional coefficient $\mu$ as described above, the texture measuring apparatus in accordance with the present invention can also measure a dynamic response of the surface force acting on the object by using the third sensor unit (PVDF piezoelectric film).

Figure 9:
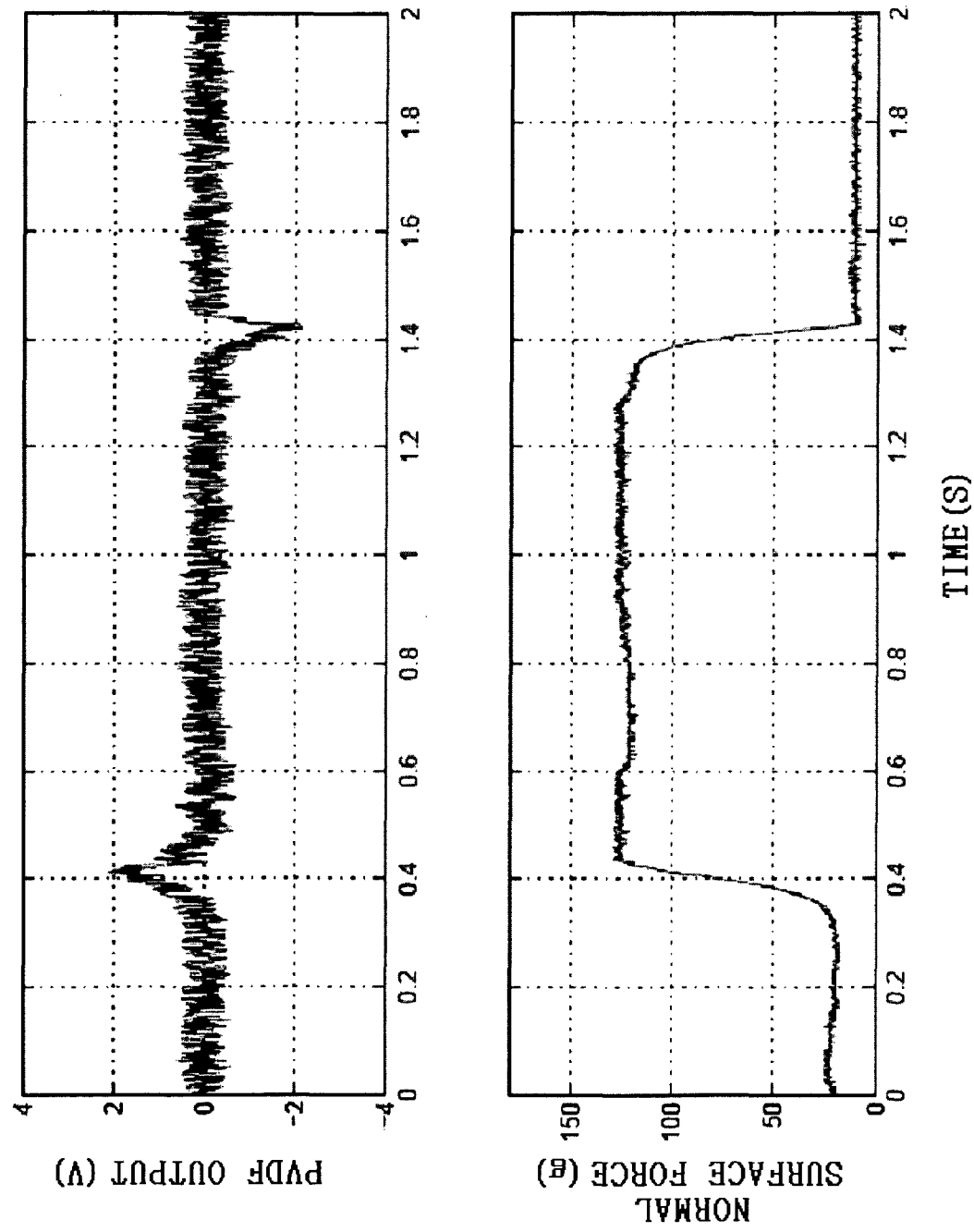
FIG. 9 illustrates measurement results in which a step input was applied to the texture measuring apparatus in accordance with the present invention.

FIG. 9 illustrates measurement results in which a step input was applied to the texture measuring apparatus in accordance with the present invention.

As shown in FIG. 9, though the normal surface force was constant while the step input was applied, a PVDF output had specific values of peaks at the start and the end points of the step input, i.e., points where the force was changed. As such, while the texture measuring apparatus 100 in accordance with the present invention is moved on the surface of the object, if the surface is changed to result a change in the force acting on the probe 20, the third sensor unit 60 detects the change and generates a signal.

Figure 10:
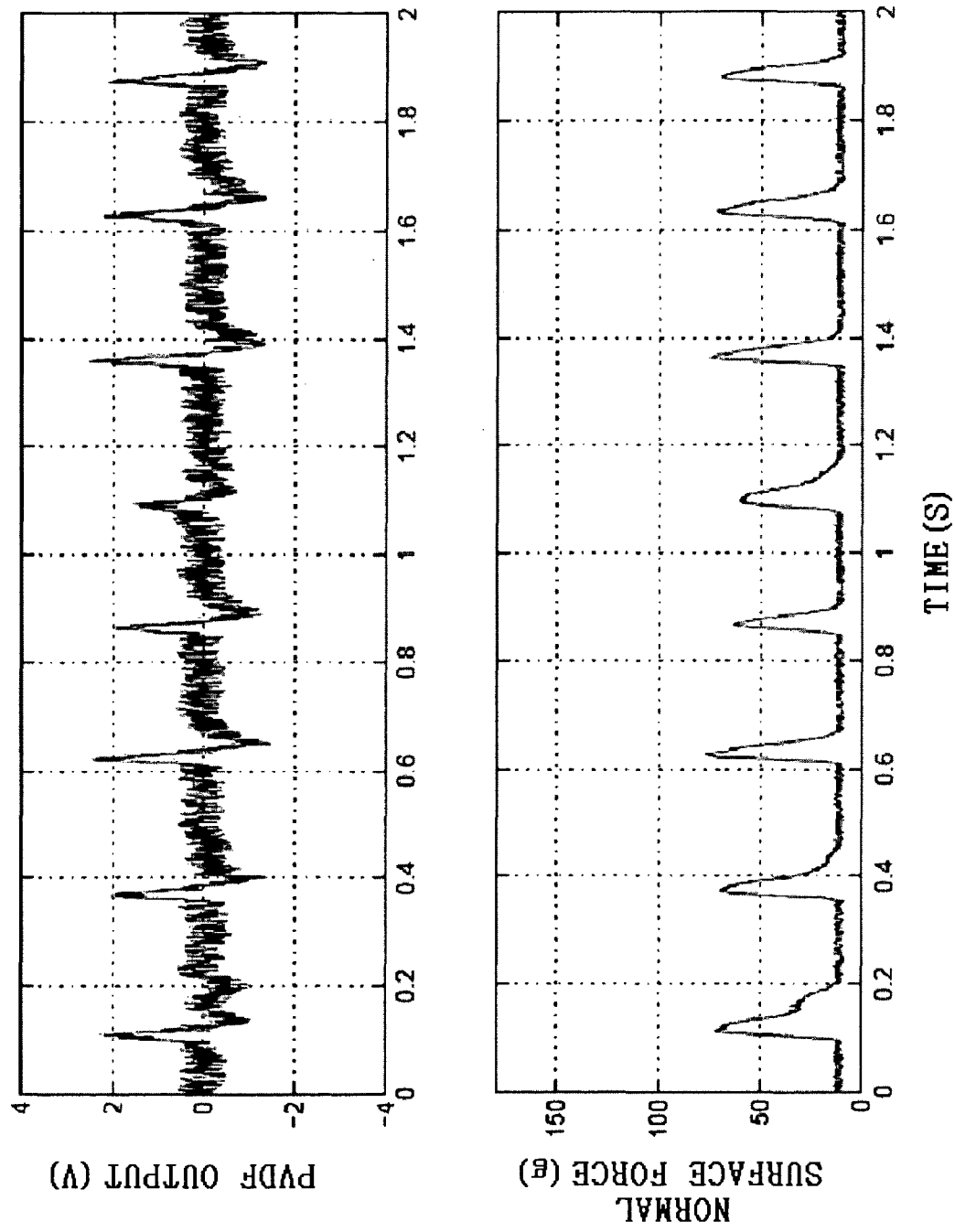
FIG. 10 illustrates measurement results in which the texture measuring apparatus in accordance with the present invention was tapped against a mouse pad.
Figure 11:
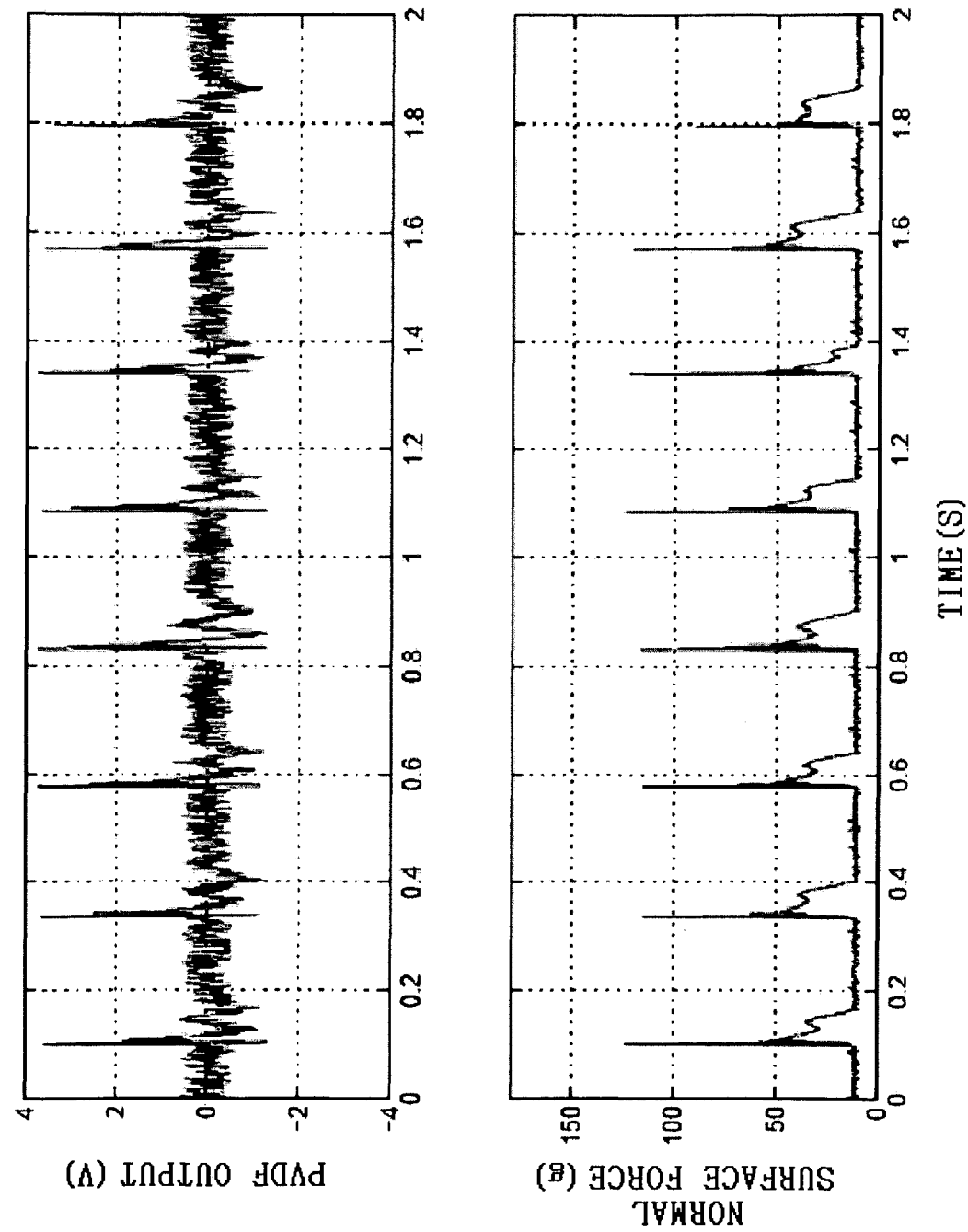
FIG. 11 illustrates measurement results in which the texture measuring apparatus in accordance with the present invention was tapped against a desk.

FIGS. 10 and 11 illustrate measurement results in which the texture measuring apparatus in accordance with the present invention was tapped against a mouse pad and against a hard desk, respectively.

As shown in FIGS. 10 and 11, peaks of the PVDF output and those of the normal surface force when the texture measuring apparatus was tapped against the hard desk were higher than peaks of the PVDF output and those of the normal surface force when the texture measuring apparatus was tapped against the mouse pad. This is because the texture of the mouse pad is softer than that of the desk.

FIG. 12 illustrates measurement results in which the texture measuring apparatus in accordance with the present invention was moved onto a desk, the desk having tapes adhered thereon at regular intervals.

As shown FIG. 12, the PVDF output had a peak at a transit point from a section A (moving on the soft tape) to a section B (moving on the desk). Further, the normal surface force showed a strong response in a region C between the section A and the section B. As such, the texture measuring apparatus in accordance with the present invention can obtain the dynamic response of the surface by using the third sensor unit 60 such as a piezoelectric film, thereby accurately measuring the surface texture of the object.

While the invention has been shown and described with respect to the embodiments, it will be understood by those skilled in the art that various changes and modification may be made without departing from the scope of the invention as defined in the following claims.

What is claimed is:

1. A texture measuring apparatus that measures surface information of an object, the apparatus comprising:
   a probe coming into contact with the object while moving on a surface of the object;
   a first sensor unit, provided at the probe, for detecting a force acting on the probe in a direction perpendicular to a lengthwise direction of the probe;
   a second sensor unit, provided at the rear of the probe, for detecting a force acting on the probe in the lengthwise direction of the probe;
   a third sensor unit, provided between the first sensor unit and the second sensor unit, for detecting variations in the forces acting on the probe; and
   a calculation unit for calculating a frictional coefficient of the surface of the object by using the forces acting on the probe and a dynamic response of the surface force of the object by using the variations in the forces.

2. The texture measuring apparatus of claim 1, wherein the first sensor unit includes a strain gauge.

3. The texture measuring apparatus of claim 1, wherein the third sensor unit includes a piezoelectric film.

4. The texture measuring apparatus of claim 3, wherein the piezoelectric film is formed of polyvinylidene fluoride.

5. The texture measuring apparatus of claim 3, wherein the piezoelectric film is covered with a protection layer.

6. The texture measuring apparatus of claim 5, wherein the protection layer is formed of silicon.

7. The texture measuring apparatus of claim 1, further comprising:
   a cylindrical housing;
   a main body fixed at the front end portion of the housing, wherein the probe is disposed at the center of the main body along the central axis of the cylindrical housing;
   wherein the main body is provided with a bearing for supporting the probe.

8. The texture measuring apparatus of claim 7, wherein the bearing has elasticity while allowing movements of the probe in the lengthwise direction thereof.

9. The texture measuring apparatus of claim 8, wherein the bearing has a cutout at either one side thereof, so that the probe restores an original position thereof when a force having been applied thereto is removed.

10. The texture measuring apparatus of claim 9, wherein the cutout is formed along a circumferential direction of the bearing.

11. A texture measuring apparatus that measures surface information of an object, the apparatus comprising:
    a cylindrical housing;
    a main body fixed at the front end portion of the housing;
    a bar-shaped probe provided at the center of the main body along the central axis of the cylindrical housing;
    a strain gauge, provided at the probe, for detecting a force acting on the probe in a direction perpendicular to a lengthwise direction of the probe;
    a force sensor, provided at the rear of the probe, for detecting a force acting on the probe in the lengthwise direction of the probe; and
    one or more piezoelectric films provided between the strain gauge and the force sensor, for detecting variations in the forces acting on the probe,
    wherein the main body is provided with a bearing for supporting the probe,
    wherein the bearing has elasticity while allowing movements of the probe in the lengthwise direction thereof, and
    wherein the bearing has a cutout at either one side thereof, so that the probe restores an original position thereof when a force having been applied thereto is removed.

12. The texture measuring apparatus of claim 11, wherein the probe includes a press plate at the rear end thereof.

13. The texture measuring apparatus of claim 11, wherein the cutout is formed along a circumferential direction of the bearing.

14. The texture measuring apparatus of claim 11, wherein the main body includes a circular ring and a pair of wings protruding rearward from the outer peripheral surface of the circular ring.

15. The texture measuring apparatus of claim 14, wherein the force sensor is disposed on a fixing plate having receiving grooves in which the wings are placed.

16. The texture measuring apparatus of claim 15, wherein each of the wings has a slot formed at the front end thereof and each of the receiving grooves has a bolt hole into which a bolt is inserted, so that the main body and the fixing plate are coupled with each other by the bolt.

17. The texture measuring apparatus of claim 11, wherein the piezoelectric films are formed of polyvinylidene fluoride.

18. The texture measuring apparatus of claim 17, wherein the piezoelectric films are protected by a silicon layer.

19. The texture measuring apparatus of claim 18, wherein, among the piezoelectric films, some are disposed in the lengthwise direction of the probe and others are disposed in the direction perpendicular to the lengthwise direction of the probe.

20. The texture measuring apparatus of claim 11, wherein the housing has an inside layer for preventing occurrence of noise.

21. The texture measuring apparatus of claim 20, wherein the inside layer is formed of copper.

22. The texture measuring apparatus of claim 11, further comprising:

a calculation unit for calculating a frictional coefficient of the surface of the object by using the forces acting on the probe and a dynamic response of the surface force of the object by using the variations in the forces.

23. A texture measuring method that measures surface information of an object, the method comprising:
  supporting a probe by a bearing having elasticity for allowing movement of the probe in a lengthwise direction of the probe,
  moving the probe while the probe is kept being in contact with a surface of the object;
  generating signals according to a force acting on the probe in a direction perpendicular to the lengthwise direction of the probe, a force acting on the probe in the lengthwise direction of the probe, and variations in the forces acting on the probe; and
  calculating a frictional coefficient of the surface of the object by using the forces acting on the probe and a dynamic response of the surface force of the object by using the variations in the forces,
  wherein the bearing has a cutout at either one side thereof, so that the probe restores an original position thereof when the force acting on the probe is removed.

24. The texture measuring method of claim 23, wherein the signal according to the force acting on the probe in a direction perpendicular to a lengthwise direction of the probe is generated by a strain gauge provided at the probe.

25. The texture measuring method of claim 23, wherein the signal according to the force acting on the probe in the lengthwise direction of the probe is generated by a force sensor provided at the rear of the probe.

26. The texture measuring method of claim 23, wherein the signal according to the variations in the forces acting on the probe is generated by a piezoelectric film formed of polyvinylidene fluoride.

* * * * *